UNITED STATES PATENT OFFICE.

JOHN F. FREDRIKSSON, OF BROOKLYN, NEW YORK, ASSIGNOR TO THE KALBFLEISCH CORPORATION, OF NEW YORK, N. Y., A CORPORATION OF NEW YORK.

METHOD OF PREPARING SATIN WHITE.

No Drawing.    Application filed February 5, 1925.   Serial No. 7,154.

Satin white is the reaction product of aluminum sulphate or alum and lime and probably consists of calcium aluminate, a small amount of calcium sulphate and whatever lime may be left over in excess. The reaction by which it is formed probably takes place in the following manner:

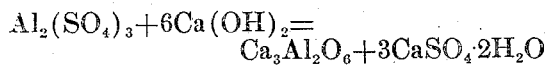
$$Al_2(SO_4)_3 + 6Ca(OH)_2 = Ca_3Al_2O_6 + 3CaSO_4 \cdot 2H_2O$$

Its principal use is as a surface coating of paper to produce a glossy surface. As generally prepared the process is somewhat complicated and an exceedingly messy one, and besides the product is more or less uncertain, as I will explain below. Usually the materials employed are lime and sulphate of alumina liquor. The lime is slacked in hot water, a large steel tank being generally used, and the mixture is automatically agitated. The milk of lime in the slacker is run through screens in order to eliminate coarse particles such as unburnt lime stone, silica and gravel, and other coarse matter. From the screens the milk of lime is drawn off into storage tanks, each being large enough to hold one charge. From these tanks the milk of lime goes into a large agitated iron tank where a measured quantity of aluminum sulphate solution is introduced.

This mixture of lime and sulphate of alumina solution is now agitated for several hours, and the mixture is diluted with water (and in some cases screened) and run into big reservoirs, from which reservoirs it is pumped through a filter press which removes excess water and gives the pulp product called satin white. The press cakes are unloaded from the filter press into the pugging machines, pugged and barrelled.

I have stated the usual process in a general way so that the advantages of my improved method could be more easily seen, and its simplicity and better resulting product appreciated.

I have further discovered that while it has heretofore been considered essential to have prolonged agitation and dilution in order to get the proper reaction with the mixture of lime and basic aluminum sulphate, that time is the equivalent of such prolonged agitation, and that the reaction can take place at ordinary room temperature just as well if a proper time is had in the vessels or containers in which the mixture resulting in satin white is stored or shipped for use, as if the prolonged agitation, dilution and many processes generally used are employed. I have found that, if basic sulphate of alumina is employed and if dry hydrated lime is mixed therewith and just enough water is added to the mixture of hydrated lime and basic aluminum sulphate to give it a pasty consistency and the reaction is allowed to take place cold or at the ordinary room temperature, two new results are attained, ($a$) due to the fact that only enough water is added to the mixture to make it into a pasty consistency, all the lime is not brought into solution but merely a small portion thereof is dissolved in the water. It is essential to the successful working out of this reaction that a basic sulphate of aluminum be employed. The small quantity of dissolved lime then reacts with the aluminum sulphate to form the satin white which is precipitated, leaving the water free to dissolve more lime to successively react with more basic aluminum sulphate. Due to the fact that the reaction is prolonged and successive and also because of the basic sulphate used, much smaller sized and more uniform particles of satin white are attained than formerly where a large quantity of water and heat were used to cause the entire reaction to take place substantially at once. I find in practice that by carefully following out my process a much superior satin white is produced than formerly; ($b$) employing my process, at the completion of the reaction, the satin white is in a pasty consistency, thereby obviating the necessity of employing filters which were formerly necessary to filter off the excess water so that the satin white could be economically shipped.

To produce satin white of the highest possible gloss or finish and therefore of the highest value to the paper coated, it is necessary to make the particles of the mixture of as nearly as possible uniform and small size, and I find that by using the mixtures in approximately the combinations stated, I more nearly approach the desired result. To accomplish this I employ hydrate of lime, basic sulphate of alumina liquor, and water, and have found that these may be mixed at a moderate temperature, and to get the best results the proportions should be approximately by weight, 4 parts of hydrate of lime;
10 parts of basic sulphate of alumina liquor 36° Baumé;
13 parts of water.

Under the old process, satin white was produced where the aluminum sulphate and lime had completely reacted, and dilution and agitation will hasten this reaction and therefore this was done. Though in my specific embodiment I have employed dry hydrated lime, it is obvious that the same results may be attained by slaking lime with a small quantity of water to form the hydrated lime in a paste. When this is done, however, the amount of water added to the mixture of slaked lime and basic sulphate of aluminum is correspondingly decreased by the amount present in the slaked lime. I have found, however, that if the hydrate of lime, sulphate of alumina mixture, and enough water to form a paste are mixed well and barrelled directly, the reaction will take place just the same, and further, that a superior article will result because the high concentration exists at all stages during the process, and concentration has a very marked influence on the texture of satin white and a tendency to produce smaller and more uniform particles. The time necessary for the reaction to be complete depends if the water content remains constant, to a considerable extent upon the physical properties of the mixture, which properties, as said before, can be regulated by various means.

The reason that all reactions where lime enters are slow, is that the solubility of lime in water is very small, and the lime must be in solution before it reacts. As soon as lime in solution has reacted, it leaves the water free to dissolve more lime, that immediately reacts, and so on until the process is complete.

It is obvious that as a small part of the hydrated lime goes into solution it will react on the basic sulphate of aluminum to form satin white which is precipitated, leaving the water free to dissolve more lime and so that the reaction will successively take place in small proportions until the hydrated lime has entirely reacted with the basic sulphate of alumina liquor to form satin white.

It will be noted that I use a highly concentrated sulphate of alumina solution, that I use lime already hydrated so that little water is necessary, that low temperatures preferably ordinary room temperature can be employed, and that by placing the mixture directly in the containers in which it may be shipped or used, I eliminate an extensive, messy, disagreeable and expensive process, while at the same time I get a better and more uniform product. Under the old process the product is always more or less a doubtful one, while under my process there is substantial uniformity, and by reason of the more nearly correct size of satin white particles, the best effect of refraction is obtained so that the product is of higher value than the product made by the old process.

In the claims I employ the words "ordinary room temperature" to signify the fact that the reaction should be carried on at the normal temperature of the room or in a relatively cold state without the application of any external heat.

I claim:—

1. The herein described method of producing satin white, which consists in mixing hydrate of lime and basic sulphate of alumina liquor and a relatively small quantity of water, and permitting the mixture to react at ordinary room temperature without further operations thereon.

2. The herein described process of preparing satin white, which consists in mixing a concentrated solution of basic sulphate of alumina with hydrate of lime and enough water to form a paste only and insufficient to completely dissolve the hydrated lime, and leaving the mixture to react at ordinary room temperature.

3. The herein described method of preparing satin white, which consists in mixing a solution of basic sulphate of alumina, hydrate of lime, and a small quantity of water, placing the same in a vessel for storage or shipment at ordinary room temperature, and permitting the reaction of the ingredients to take place in the said container.

4. The herein described method of preparing satin white, which consists in mixing a concentrated solution of basic sulphate of alumina with hydrate of lime and enough water to form a paste only placing the same without further treatment in a container for shipment or use at ordinary room temperature, and leaving the ingredients to react in the said container.

5. The herein described process of producing satin white, which consists in mixing a solution of basic sulphate of alumina, hydrate of lime, and a small quantity of water, placing the same before complete reaction in a container at ordinary room temperature, and permitting final reaction in the container.

6. The herein described method of preparing satin white, which consists in mingling basic sulphate of alumina, hydrate of lime and enough water to form a paste only, placing the mixture before complete reaction in a shipping container at ordinary room temperature, and permitting complete reaction in the said container.

7. The herein described method of preparing satin white which consists in mixing highly concentrated basic sulphate of alumina in solution, hydrate of lime, and sufficient water to give a pasty consistency to the mixture, placing the mixture before complete reaction in a shipping container at ordinary room temperature, and permitting complete reaction in the said container.

8. The herein described process of preparing satin white, which consists in mixing a concentrated solution of basic sulphate of alumina and hydrated lime and a much less quantity of water than sufficient to thoroughly dissolve the lime and permitting the mixture to react at ordinary room temperature, whereby a portion of the lime only is brought into solution to act on the sulphate of alumina at a time, and on precipitation of the calcium aluminate formed thereby, the water may become continuously freed to successively dissolve further quantities of lime to successively react with the balance of the basic sulphate of alumina until the entire reaction is complete.

9. The herein described process of preparing satin white, which consists in mixing a concentrated solution of basic sulphate of alumina and hydrated lime and a much less quantity of water than sufficient to thoroughly dissolve the lime and placing the same in a vessel for storage or shipment and permitting the mixture to react at ordinary room temperature, whereby a portion of the lime only is brought into solution to act on the sulphate of alumina at a time, and on precipitation of the calcium aluminate formed thereby, the water may become continuously freed to successively react with the balance of the basic sulphate of alumina until the entire reaction is complete.

In testimony whereof, I have signed my name to this specification this 3d day of February, 1925.

JOHN F. FREDRIKSSON.